(12) United States Patent
Iiya

(10) Patent No.: US 6,971,708 B2
(45) Date of Patent: Dec. 6, 2005

(54) FIXING STRUCTURE OF PROTECTOR

(75) Inventor: Nobuyo Iiya, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/405,216

(22) Filed: Apr. 3, 2003

(65) Prior Publication Data

US 2003/0189352 A1    Oct. 9, 2003

(30) Foreign Application Priority Data

Apr. 4, 2002  (JP) ............................ P2002-102569

(51) Int. Cl.[7] ............................................... H02G 3/04
(52) U.S. Cl. .................. 296/191; 296/146.7; 296/1.08
(58) Field of Search ............................ 296/191, 146.7, 296/1.08, 187.03, 187.05; 293/102, 120, 293/132; 174/66

(56) References Cited

U.S. PATENT DOCUMENTS 5,538,210 A * 7/1996 Ohmori ........................ 248/71
5,636,866 A * 6/1997 Suzuki et al. ................ 280/748
5,641,195 A * 6/1997 Patel et al. ............. 296/187.05
5,957,512 A * 9/1999 Inada et al. .................. 293/102
6,049,952 A * 4/2000 Mihelich et al. ............... 24/292
6,145,908 A * 11/2000 Deb et al. ................... 296/39.1
6,474,724 B2 * 11/2002 Lemmon et al. ........ 296/187.05

FOREIGN PATENT DOCUMENTS

JP    2-17920    2/1990

* cited by examiner

Primary Examiner—H. Gutman
(74) Attorney, Agent, or Firm—Sughrue Mion, PLLC

(57) ABSTRACT

In a protector mounted on a panel body, a protector body has a surface facing the panel body. A plurality of fixing members are provided on the protector body and are operable to fix the protector on the panel body. A protrusion is protruded from the surface of the protector body at a position between each adjacent fixing members. The protrusion is arranged so as to generate a pressing force against the panel body which is originated from stresses occurred when the protector is mounted on the panel body with the fixing members.

5 Claims, 4 Drawing Sheets

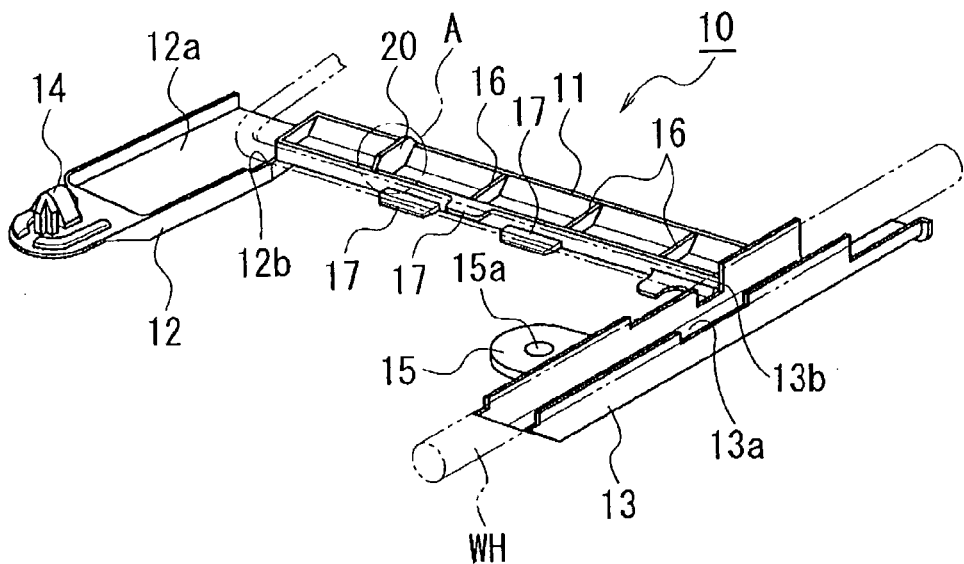
Fig. 1A
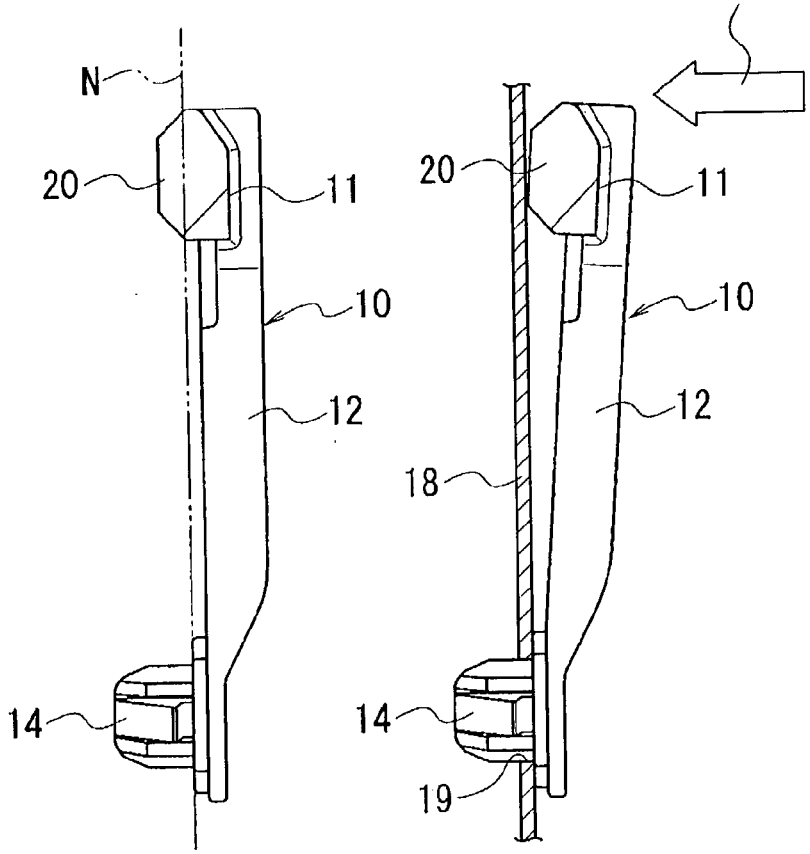
Fig. 1B
Fig. 1C

FIXING STRUCTURE OF PROTECTOR

BACKGROUND OF THE INVENTION

The present invention relates to a protector which is fixed on a vehicle panel or the like with a plurality of fixing members.

The protector 1 which has been fixed at two positions by the clip 5 and the screw securing member 6 is designed in such a manner that a face 2b of the protector base 2 adjacent to the vehicle panel 7 is arranged in a state tightly brought into contact with the vehicle panel 7. However, at the two positions of the clip 5 and the screw securing member 6 of the protector 1, stresses for fixing the protector 1 to the panel 7 may be generated, and there is an anxiety that depending on the manner in which these stresses act, the protector base 2 may be fixed to the panel 7 in a state lifted from the panel 7 or in a state merely brought into contact with the panel. When the protector base 2 has been fixed in the lifted state in this manner, it has been a problem that the protector base 2 may easily vibrate with vibration of the vehicle, and that the protector base 2 may strike the panel 7 causing abnormal noises.

The protector base 2 is provided with harness retaining pieces 2a, and both of the arm members 3, 4 are respectively provided with harness containing passages 3a and 4a. In this structure, a wire harness which is not shown is arranged inside the harness containing passages 3a, 4a and retained by the harness retaining pieces 2a. On the other hand, a vehicle panel 7 is provided with a fitting hole 8 and a screwed part to which the screw securing member 6 is to be secured by a screw which is not shown.

As shown in FIG. 5, the protector 1 having the structure as described above is fixed to the vehicle panel 7, by engaging the clip 5 in the fitting hole 8, and by securing the screw securing member 6 at the screwed part (not shown).

A similar structure is disclosed in Japanese Utility Model Publication No. 2-17920U.

The protector 1 which has been fixed at two positions by the clip 5 and the screw securing member 6 is designed in such a manner that a face 2b of the protector base 2 adjacent to the vehicle panel 7 is arranged in a state tightly brought into contact with the vehicle panel 7. However, at the two positions of the clip 5 and the screw securing member 6 of the portector 1, stresses for fixing the protector 1 to the panel 7 may be generated, and there is an anxiety that depending on manner in which these stresses act, the protector base 2 may be fixed to the panel 7 in a state lifted from the panel 7 or in a state merely brought into contact with the panel. When the protector base 2 has been fixed in the lifted state in this manner, it has been a problem that the protector base 2 may easily vibrate with vibration of the vehicle, and that the protector base 2 may strike the panel 7 causing abnormal noises.

SUMMARY OF THE INVENTION

It is therefore an object of the invention to provide a fixing structure of a protector in which occurrence of abnormal noises due to vibration can be reliably prevented.

In order to achieve the above object, according to the invention, there is provided a protector mounted on a panel body, comprising:

a protector body, having a surface facing the panel body;

a plurality of fixing members, provided on the protector body and operable to fix the protector on the panel body; and a protrusion, protruded from the surface of the protector body at a position between each adjacent fixing members.

Preferably, the protrusion is arranged so as to generate a pressing force against the panel body which is originated from stresses occurred when the protector is fixed on the panel body with the fixing members.

In such a configuration, since the protector is fixed to the panel body in a state where the projection presses the panel body, the protector will not easily vibrate due to the reason such as vibration of a vehicle.

Preferably, the protector body includes a base member and a plurality of arm members extended from the base member. Here, the fixing members are arranged in at least the arm members, and the protrusion is arranged in at least the base member.

In such a configuration, the noise prevention can be attained more reliably.

Preferably, the fixing member includes a clip member which is elastically fitted into a fitting hole formed in the panel body.

In such a configuration, the fixing operation of the protector can be easily conducted.

Preferably, the fixing member includes a member which is secured on the panel body with a screw member.

In such a configuration, the protector can be rigidly fixed to the panel.

BRIEF DESCRIPTION OF THE DRAWINGS

The above objects and advantages of the present invention will become more apparent by describing in detail preferred exemplary embodiments thereof with reference to the accompanying drawings, wherein:

FIG. 1A is a perspective view of a protector according to one embodiment of the invention;

FIG. 1B is a side view of the protector before the protector is fixed to a panel body;

FIG. 1C is a side view of the protector in a state where the protector is fixed to the panel body;

DETAILED DESCRIPTION OF THE PREFERRED EMBODIMENTS

Preferred embodiments of the invention will be described below referring to the accompanying drawings.

Figure 2:
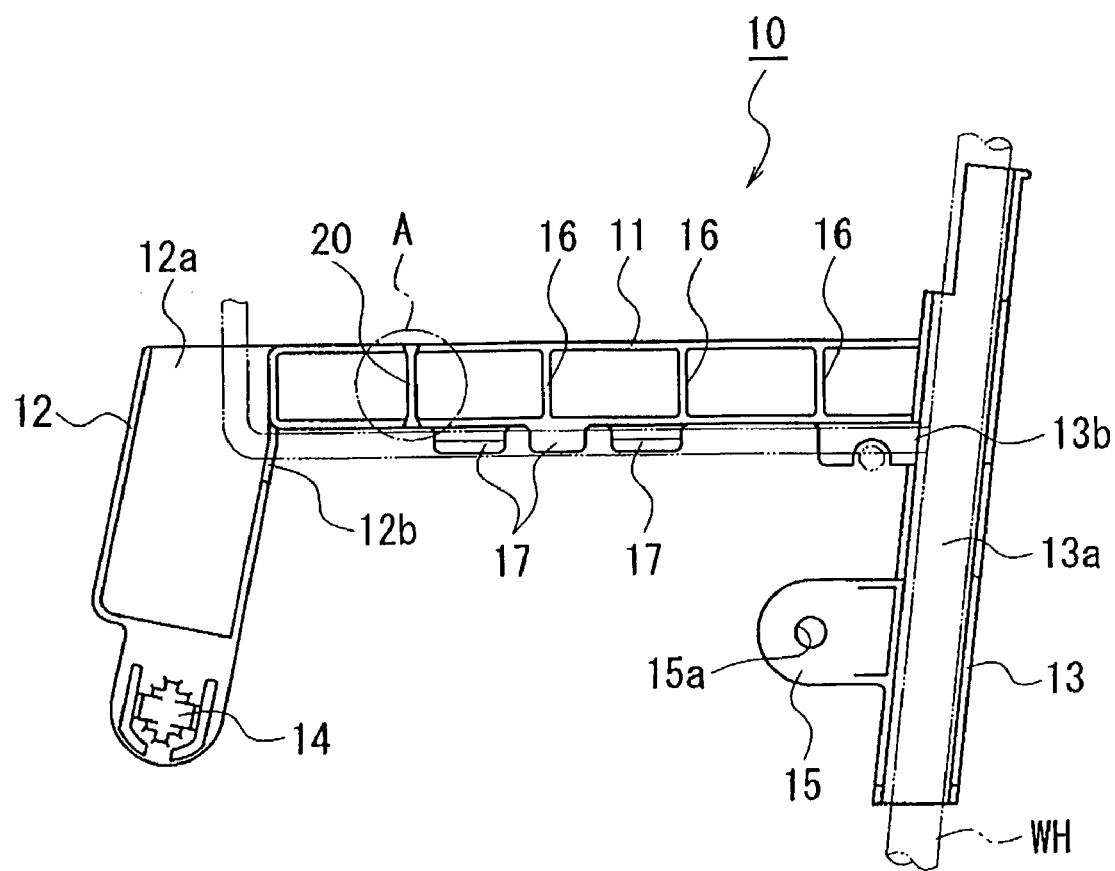
FIG. 2 is a plan view of the protector of the embodiment.

As shown in FIG. 1A and FIG. 2, according to one embodiment of the invention, a protector 10 made of synthetic resin includes a protector base 11 rectilinearly extending in one direction, a pair of arm members 12, 13 which are extended from both ends of the protector base 11 in a direction substantially perpendicular to the protector base and in the same direction with respect to each other, a clip 14 which is a fixing member provided on one of the arm members 12 at a position separated from the protector base 11, and a screw securing member 15 which is a fixing member provided on the other arm member 13 at a position separated from the protector base 11.

A plurality of reinforcing ribs 16 are provided at an appropriate interval on an inner face of the protector base 11, and a plurality of harness retaining pieces 17 for holding a wire harness WH are provided on an outer face of the protector base 11. In both arm members 12, 13, there are respectively formed harness containing passages 12a, 13a in a C-shape for containing the wire harness WH, and cut-outs 12b, 13b for leading in and out branched portions of the wire harness WH.

The clip 14 has an elastic locking piece which is gradually enlarged in diameter from a distal end to a base end. The clip 14 is adapted to be restored by elastic deformation after it has been reduced in diameter by elastic deformation thereby to be engaged in a fitting hole 19 which is provided in a vehicle panel 18. The screw securing member 15 has a screw securing hole 15a, and is adapted to be secured to a screwed part (not shown) of the vehicle panel 18 employing a securing member (not shown) such as a screw or the like.

Figure 3:
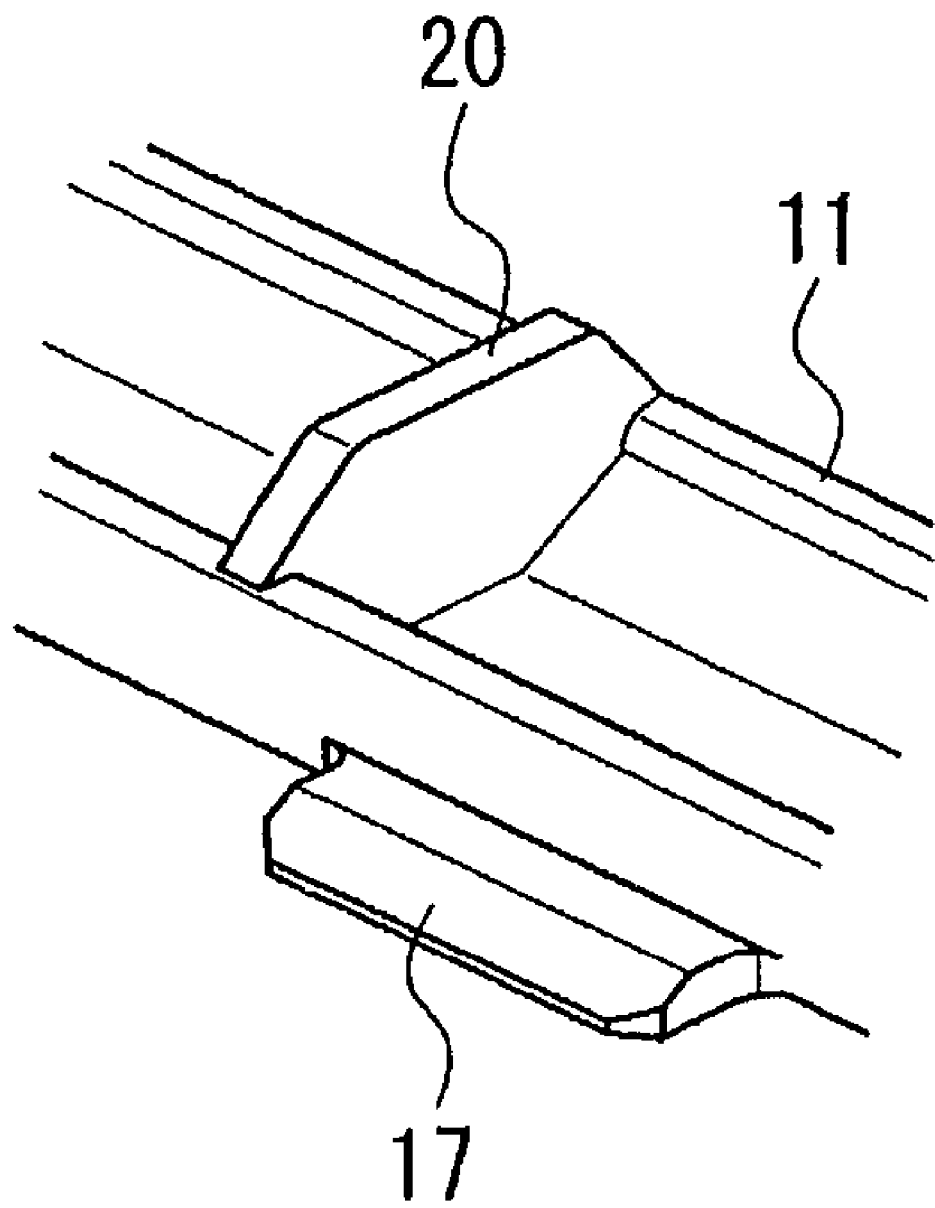
FIG. 3 is an enlarged perspective view of an encircled part A in FIGS. 1A and 2.
Figure 4:
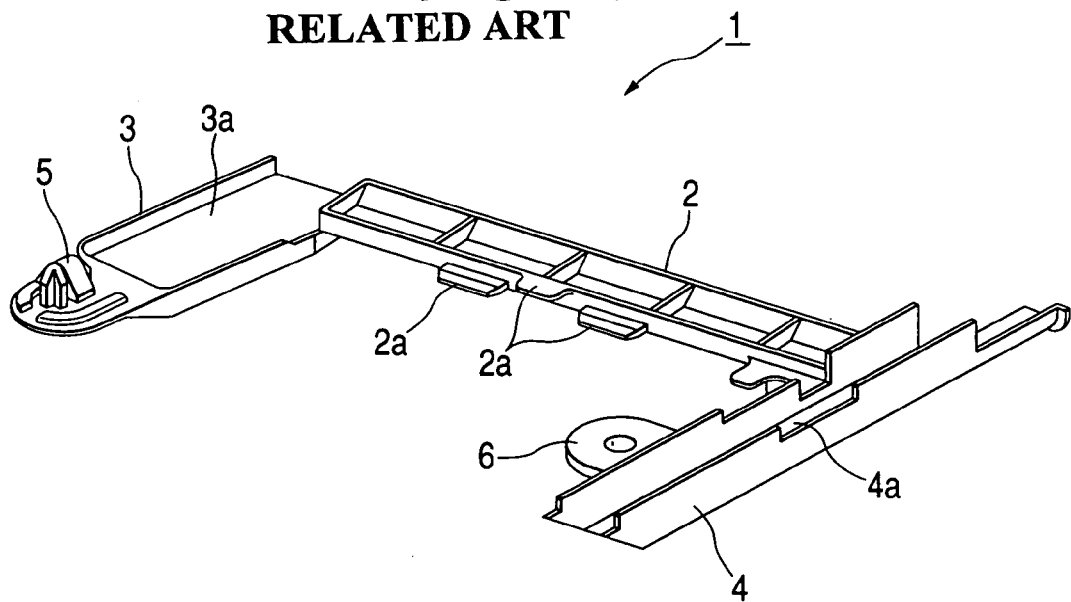
FIG. 4 is a perspective view of a related-art protector.
Figure 5:
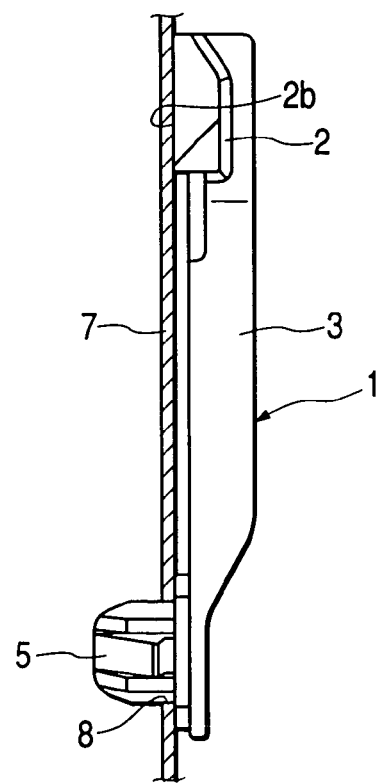
FIG. 5 is a side view of the related-art protector.

Further, as shown in FIG. 3, a rib-like projection 20 which protrudes toward the vehicle panel 18 at a position between the clip 14 and the screw securing member 15 and presses the vehicle panel 18 with a pressing force F in a state where the protector has been fixed to the vehicle panel 18 is integrally formed with the protector base 11 so as to project therefrom. In this embodiment, the projection 20 is formed by extending one of the above described plurality of the ribs 16 toward the vehicle panel 18, and is so designed as to protrude at least from a reference contact plane N with respect to the vehicle panel 18, as shown in FIG. 1B.

The protector 10 having the above described structure is fixed to the vehicle panel 18, by engaging the clip 14 in the fitting hole 19, and by securing the screw securing member 15 to the screwed part. When the protector 10 is fixed to the vehicle panel 18 at the two positions of the clip 14 and the screw securing member 15, torsional stress is generated in the arm members 12, 13, and the pressing force F originated from this torsional stresses is exerted on the projection 20. Consequently, as shown in FIG. 1C, the protector 10 is fixed to the vehicle panel 18 in such a manner that the projection 20 of the protector base 11 may press the vehicle panel 18 with the pressing force F. As the results, the protector 10 will not easily vibrate with the vibration of the vehicle, and occurrence of noises due to the vibration can be reliably prevented.

Further, in the structure that the two arm members 12, 13 are extended from the protector base 11, and that the clip 14 and the screw securing member 15 are provided on these arm members 12, 13 at the positions separated from the protector base 11, the protector base 11 is likely to be fixed in a lifted state from the vehicle panel 18, because the protector base 11 is fixed by way of the two arm members 12, 13. At the same time, there is such an anxiety that the protector base 11 may violently vibrate with the vibration of the vehicle and large noises may be produced, in case where the protector base 11 has been fixed in such a lifted state. However, in this embodiment, in the structure liable to produce such large noises, occurrence of the noises can be effectively and reliably prevented.

In the above described embodiment, there are provided two fixing members, one of which is the clip 14 and the other one is the screw securing member 15, and therefore, the protector 10 can be fixed by engaging operation of engaging the clip 14 in the fitting hole 19 as well as by securing operation of securing the screw securing member 15 with the securing element. As the results, the protector 10 can be rigidly fixed to the vehicle panel 18 while easiness of the fixing operation can be attained.

Alternatively, all the fixing members may be designed in a form of the clip 14, and by designing them in this manner, the fixing operation of the protector 10 will become very easy. It is also possible to design all the fixing members in a form of the screw securing member 15, and by designing them in this manner, the protector 10 will be very rigidly fixed.

It is to be noted that although the two fixing members include the clip 14 and the screw securing member 15 in the above described embodiment, the structure of the fixing members is not limited to them, but any structure which can fix the protector to the vehicle panel 18 may be applicable.

Further, according to the above described embodiment, the two fixing members, the clip 14 and the screw securing member 15 are provided by way of the arm members 12, 13 of the protector base 11. However, the two fixing members may be provided directly on the protector base 11.

Still further, although the fixing members are provided at the two positions in the above described embodiment, the present invention is applicable also in the protector 10 having the fixing members at three or more positions. In case of providing the fixing members at three or more positions, the projections should be respectively provided between the adjacent fixing members.

What is claimed is:

1. A protector mounted on a panel body, comprising:
   a protector body, having a surface facing the panel body;
   a plurality of fixing members, provided on the protector body and operable to fix the protector on the panel body; and
   a protrusion, protruded from the surface of the protector body at a position between each adjacent fixing member, the protrusion being abutted against the panel body o thereby flex a part of the protector body.

2. The protector as set forth in claim 1, wherein the protrusion is arranged so as to generate a pressing force against the panel body which is originated from stresses occurred when the protector is fixed on the panel body with the fixing members.

3. The protector as set forth in claim 1, wherein:
   the protector body includes a base member and a plurality of arm members extended from the base member; and
   the fixing members are arranged in at least the arm members, and the protrusion is arranged in at least the base member.

4. The protector as set forth in claim 1, wherein the fixing member includes a clip member which is elastically fitted into a fitting hole formed in the panel body.

5. The protector as set forth in claim 1, wherein the fixing member includes a member which is secured on the panel body with a screw member.

* * * * *